Figure 1:
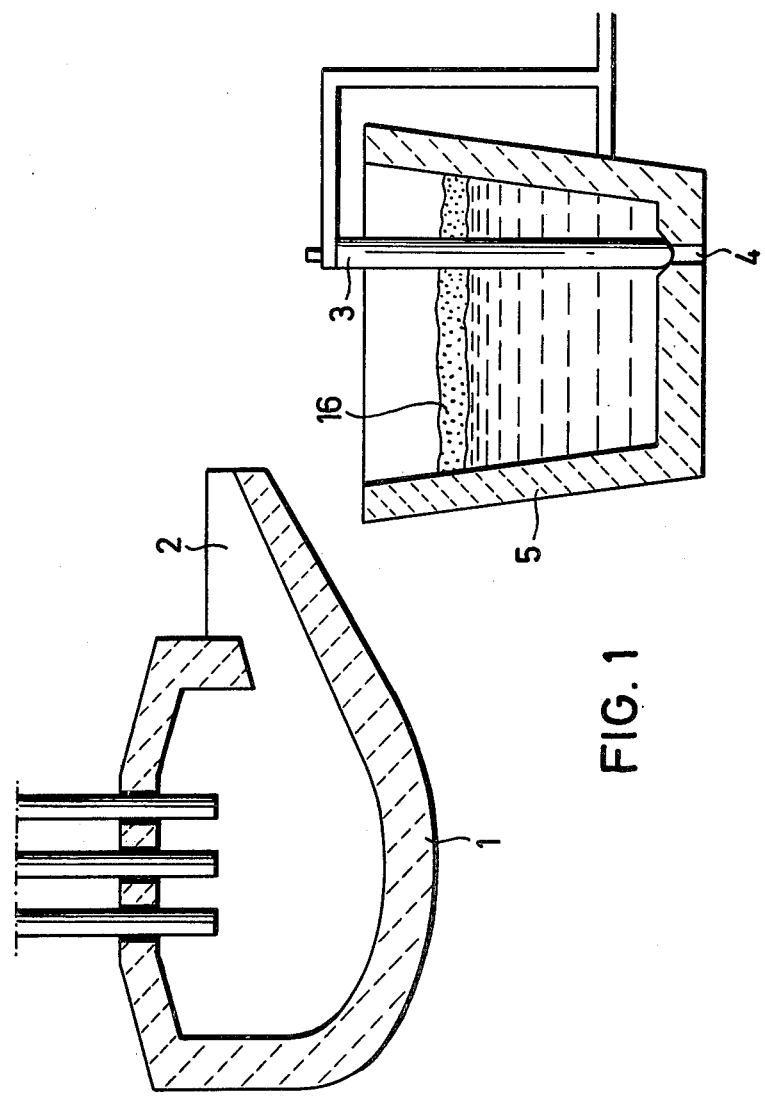

United States Patent [19]

Kutscher et al.

[11] 4,199,350
[45] Apr. 22, 1980

[54] METHOD FOR THE PRODUCTION OF QUALITY STEELS

[75] Inventors: Horst Kutscher, Dortmund; Gernot Zahs, Dortmund-Lichtendorf, both of Fed. Rep. of Germany

[73] Assignee: Vacmetal Gesellschaft fur Vakuummetallurgie mbH, Dortmund, Fed. Rep. of Germany

[21] Appl. No.: 885,412

[22] Filed: Mar. 10, 1978

Related U.S. Application Data

[62] Division of Ser. No. 679,118, Apr. 20, 1976, Pat. No. 4,094,495.

[30] Foreign Application Priority Data

May 17, 1975 [DE] Fed. Rep. of Germany ....... 2522194

[51] Int. Cl.$^2$ ............................................. C21C 7/00
[52] U.S. Cl. ......................................... 75/46; 75/58; 75/61
[58] Field of Search ....................... 75/46, 61, 60, 129, 75/130 R, 58, 130.5; 266/208

[56] References Cited

U.S. PATENT DOCUMENTS

| | | | |
|---|---|---|---|
| 2,991,174 | 7/1961 | McVicker | 75/130.5 |
| 3,201,224 | 8/1965 | Grim | 266/208 |
| 3,929,464 | 12/1975 | Todd | 75/58 |
| 3,960,547 | 1/1976 | Kirkpatrick | 75/46 |
| 3,998,625 | 12/1976 | Koros | 75/58 |
| 4,036,635 | 7/1977 | Klapdar | 75/58 |

*Primary Examiner*—P. D. Rosenberg
*Attorney, Agent, or Firm*—Lawrence I. Field

[57] ABSTRACT

A method for producing steels within a very close analysis tolerance in which the raw materials are melted down in a first vessel, the melt is then tapped into a second vessel in which deslagging is accomplished, and thereafter the melt is subjected to treatment under a vacuum. An apparatus for carrying out the method is also described.

16 Claims, 3 Drawing Figures

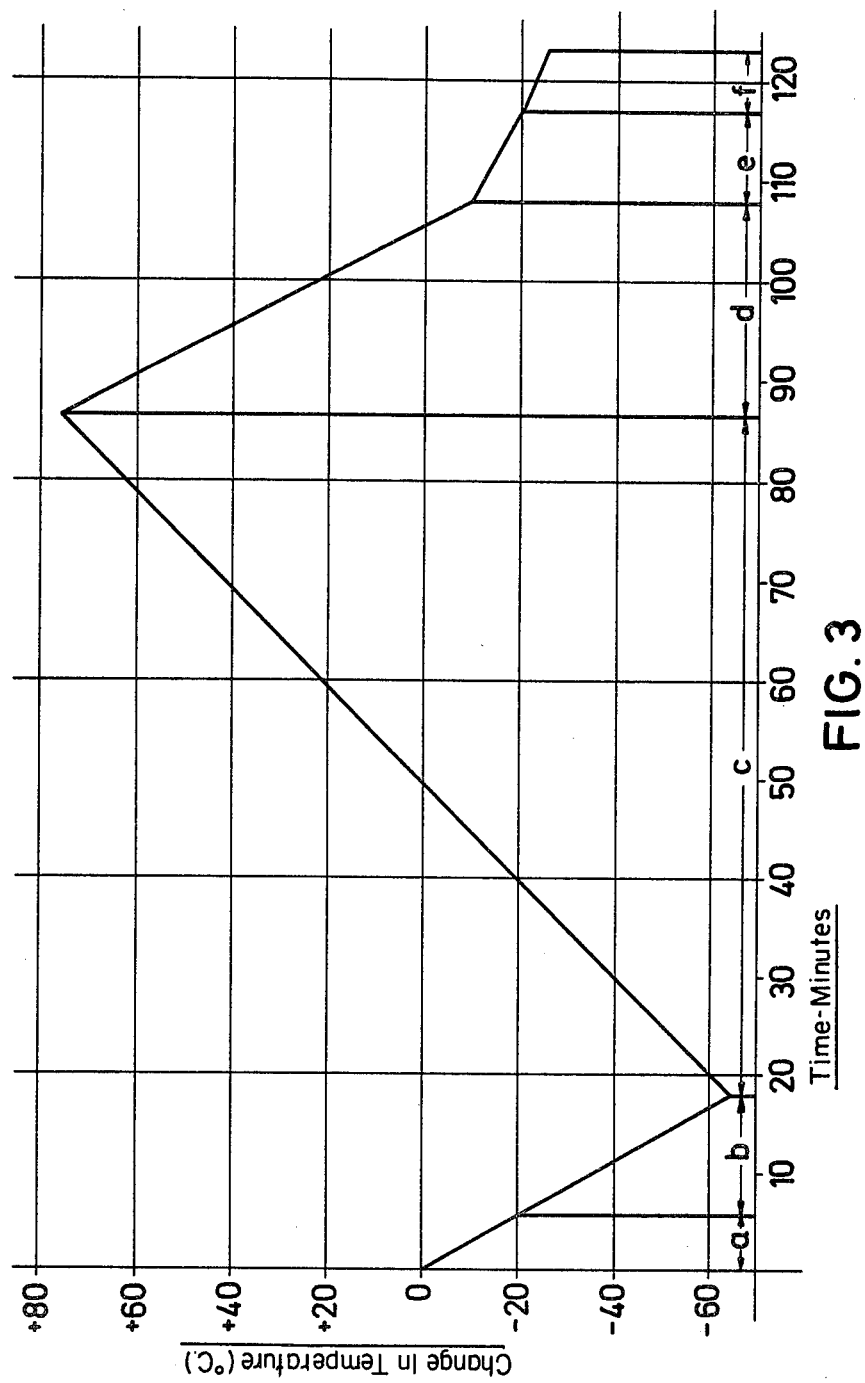

METHOD FOR THE PRODUCTION OF QUALITY STEELS

This is a division of application Ser. No. 679,118, filed Apr. 20, 1976, now U.S. Pat. No. 4,094,495.

The invention concerns a process and device for the manufacture of quality steels through the melting, refinement and alloying of iron melts and particularly steel melts.

In the present context the term "quality steels" is meant to indicate those steels the analysis of which fall within the following approximate tolerances:

| | | |
|---|---|---|
| ± | .025% | carbon |
| ± | .075% | silicon |
| ± | 0.10% | manganese |
| ± | 0.30% | nickel |
| ± | 0.50% | chromium |
| ± | .015% | aluminum | and the sulfur content of which does not exceed 0.035%, preferably at the most 0.010%, and even more preferably 0.005% at the most. Furthermore, quality steels should contain in general at the most 10 to 40 ppm of oxygen and at the most 3.5 ppm preferably at the most 2 to 1 ppm of hydrogen. In a given case the steel should, with simultaneous presence of nitride formers such as titanium, contain at the most 200 ppm of nitrogen.

Preferably the analysis should not depart from the intended analysis by more than the following:

| | | |
|---|---|---|
| ± | 0.015% | carbon |
| ± | 0.05% | silicon |
| ± | 0.10% | manganese |
| ± | .005% | aluminum | and with rust-free or corrosion-resistant steels in each case

± 0.20% of nickel and chromium.

Quality steels are usually manufactured in electric furnaces, Siemens-Martin furnaces, oxygen convertors and oxygen rotors. Normally several process steps, e.g. melting down, refining, desulphurizing, deoxidizing and alloying, are carried out in one single unit of apparatus. Only the vacuum decarbonization or vacuum deoxidation often takes place in a special unit, even though vacuum electric furnaces are known in which a melt can be finished through to the pouring of the same. The practice is also known of carrying out individual process steps in special units, for example, desulphurizing an iron or a steel melt in a ladle, for example, a shaking ladle.

The disadvantage of the known processes for the manufacture of quality steels resides in the fact that between the melting down of an at least partially solid charge and the pouring several process steps are always carried out in one and the same unit. The precision of the compounding of the steel suffers by that procedure as it is in practice impossible to obtain in the same metallurgical unit in every case the optimal conditions for different process steps.

A further disadvantage of the known processes resides in the fact that costly steel-producing units cannot be used optimally. For example, when using a single vessel for dephosphorization and desulphurization, before the desulphurization the slag which is rich in $P_2O_5$ and heavy metal oxide must be drawn off in order that a desulphurizing slag may be applied, melted down and brought to reaction with the molten metal.

Clean slag removal, which is necessary for attaining the sulphur content mentioned above, can, if at all, only be carried out in that way with great difficulty and very time consumingly. Sulphur contents below 0.005% are hardly possible by conventional methods because of the inevitable slag residues. Even if the values mentioned should be attained temporarily, a renewed rise in the sulphur content occurs during the further conventional process steps up to the pouring, since the use of oxygen for refining leads during the further treatment to oxidization of the desulphurizing slag. Deslagging, desulphurization and alloying in the steel producing unit, and also the time taken for sampling and carrying out chemical analysis, have hitherto led to unsatisfactory utilization of the steel producing units; for example, to poor utilization of the high performance transformers of UHP furnaces.

It is the purpose of the present invention to eliminate the disadvantages of the conventional processes and in particular to create a process for the manufacture of quality steels which makes possible, through a deliberate selection of the process conditions in every stage of the process, the production of quality steels with very small compositional deviations. The solution of that problem is based on the concept of carrying out each of the material process steps between the melting down and the pouring in a special unit. More specifically, the invention resides in a process in which according to the invention in each case in a special unit a basic melt is prepared,
the melt is deslagged,
is vacuum treated, with agitation of the bath,
is heated,
is alloyed, and
is desulphurized.

It is preferable for the melting down of the charge materials, with the exception of a partial decarbonization if necessary, and of the dephosphorization, to take place without metallurgical reactions. The charge materials are at the same time so selected that the contents by way of accompanying or alloying elements, with the exception of the carbon and the sulphur, are kept below the desired nominal analysis. At the same time as, or after, the at least partial decarbonization and the dephosphorization, the temperature of the melt is set at a predetermined value, which need be only so high as to cover the temperature losses during the following process steps of tapping and deslagging.

The melt is then tapped and deslagged. This is accomplished as follows: the furnace heat is poured into a transfer ladle, the melt flows through the bottom outlet of the transfer ladle into a receiving ladle lying at a lower level and if necessary preheated, while the furnace slag, which has a high content of $P_2O_5$ and heavy metal oxides and would consequently interfere with the ensuing operations, is retained in the transfer ladle. That results in the advantage that the melt in the transfer ladle is covered by a layer normally about 2.5 to 35 cm thick of slag from the melting down unit until it flows into the receiving ladle, while the surface of the metal bath in the receiving ladle is slag-free.

In the receiving ladle the melt can, during or immediately after its reception in the ladle, or even in the course of a later step in the process, be covered over, with a cover consisting of calcium oxide, silica and/or alumina and with some manganese oxide, for example with a cover consisting of 25–80 parts of calcium oxide and 0–20 parts silica and the remainder substantially alumina. Preferred slag compositions fall within the following coordinates on a ternary diagram:

| CaO | SiO$_2$ | Al$_2$O$_3$ |
|---|---|---|
| 60 | 0 | 40 |
| 40 | 0 | 60 |
| 60 | 10 | 30 |
| 30 | 15 | 55 |

The slag should be poor in easily reducible oxides. It is particularly advantageous if the receiving ladle is maintained in a vacuum during the deslagging. In that case the melt leaving the bottom outlet of the transfer ladle is spray dispersed by way of a run through degasification, and the resulting droplets are rapidly degasified. For promotion of the degasification it is possible at the same time to blow an agitating gas into the deslagged melt through a porous plug, for example, fitted in the bottom of the receiving ladle or to stir the melt electro-magnetically. Instead of, or in addition to, the aforementioned vacuum treatement in the receiving ladle the melt can be treated by a partial quantity process, for example, in a DH installation in a vacuum. For that special treatment all that is necessary is for the receiving ladle, which is mounted on a trolley, to be moved beneath the partial quantity degasification installation.

Instead of the partial quantity treatment, however, the vacuum treatment can be carried out as a degasification in the ladle, in a vacuum chamber or with the aid of a vacuum cover. This should be associated with a stirring round of the melt while the melt is flushed with nitrogen and/or some other inert gas, in order to intensify the vacuum treatment and to attain a rapid concentration compensation in the melt. The quantity of stirring gas during the vacuum treatment is for example about 0.1 to 5 liters per ton per minute. That quantity of stirring gas can in extreme cases be increased tenfold. The stirring round can however also be effected electro-magnetically.

The melt can at least in part be alloyed during the vacuum treatment. If the additional vacuum treatment is eliminated the melt is alloyed and deoxidized at normal pressure with simultaneous stirring. The melt can, in that case also, be stirred round electro-magnetically, but for preference the stirring round is effected with the aid of an inert gas such as argon or nitrogen in a quantity of 0.5–170 liters per ton per minute, preferably 5–17 liters per ton per minute.

After the tapping, before or after the vacuum treatment or the alloying and deoxidizing, the melt is, with simultaneous stirring round with the gases mentioned above in the quantities mentioned at normal pressure or in a vacuum heated up to a temperature lying so far above the requisite pouring temperature that the temperature losses during the ensuing process stages are compensated for.

The desulphurization can take place entirely or partially in a vacuum or at atmospheric pressure (also during the heating up). As desulphurizing agents, synthetic slags are suitable having a composition corresponding to that of the covering slag mentioned above. But it is possible and preferable for the melt to be desulphurized with a desulphurizing agent blown in through a lance with the use of a carrier gas such as nitrogen or argon. In that case the stirring round of the melt with other agencies becomes unnecessary since the carrier gas laden with the desulphurizing agent ensures adequate movement of the bath. Calcium-silicon, calcium carbide and magensium are examples of suitable desulphurizing agents.

Process steps of that kind, which are carried out at atmospheric pressure, may result in the formation of dust or smoke, for example desulphurizing by means of a lance or heating up at atmospheric pressure. In those cases operations are conducted with a hood which is sealed off as well as possible but is not vacuum tight. To that hood is connected, through a valve, a water jet or a steam jet suction stage a pre-vacuum for which is produced with the aid of the last stages of the vacuum steam jet suction unit. With an air inlet valve at the entrance to that auxiliary stage, the pressure under the roof is so regulated as just to prevent any flames or smoke from breaking out through the inevitable openings in a non-vacuum tight cover or roof. By that means it is possible with a minimum of foreign air to suck away the dust or vapor arising from the particular process step in question and to clean them by means of the condensors of the steam jet suction unit.

After the ensuing desulphurization, the melt is poured in the usual way. If the temperature of the melt is sufficient, the heating up can also be effected in sequence with the desulphurization, that is to say immediately before the pouring.

Figure 2:
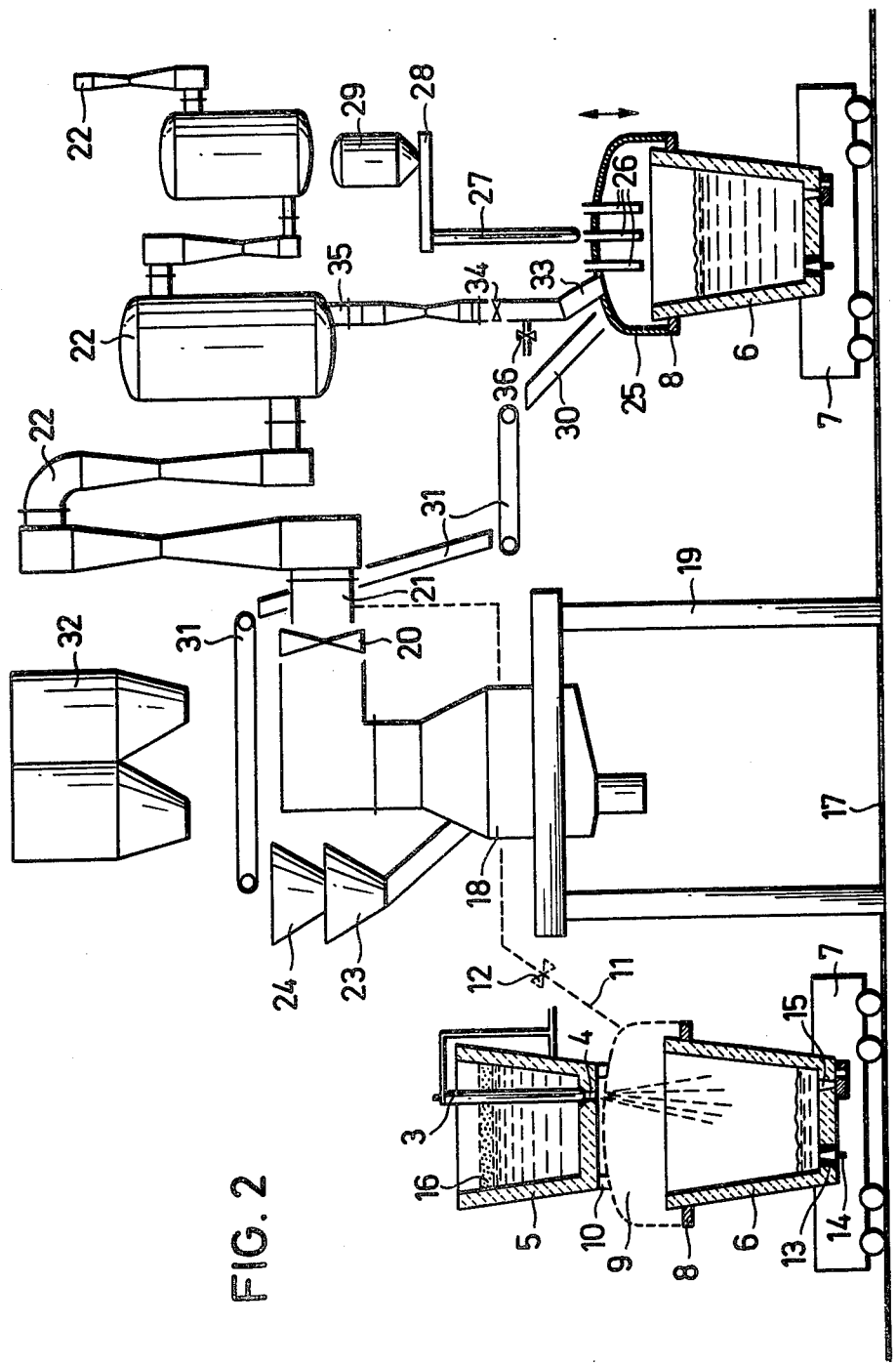

In the description which follows, the invention is explained in greater detail by reference to a preferred embodiment and to the drawings, in which:

FIGS. 1 and 2 are diagrammatic representations of apparatus for carrying out the process according to the invention; and FIG. 3 is an illustration in the form of a graph showing the course of the process with the passage of time.

The apparatus includes an electric arc furnace 1 for producing the basic melt, from which furnace the melt with the melting down slag is poured into a transfer ladle 5 equipped with a stopper rod 3, and a bottom outlet 4 and having a conventional fire resistant lining, made for example of fire clay. The transfer ladle 5 is moved by means of a crane over a reception ladle 6 (FIG. 2), and after the stopper rod 3 has been raised, ladle 5 is emptied with the exception of the slag. The emptying proceeds relatively fast as the bottom outlet 4 has a relatively large cross-section, for example a diameter of 90 mm.

The receiving ladle 6 is mounted on a trolley 7 and can be equipped with a flange 8 for the reception of a hood 9 which has a flange 10 for vacuum tight connection to the transfer ladle 5. The vacuum tight hood 9 is connected through a pipe 11 and a throttle valve 12 to a vacuum unit 22. In addition, the bottom of receiving ladle 6 has a porous stone 13 with a connection 14 for a flushing or stirrer gas duct, and also a sliding closure 15.

The receiving ladle 6 has a conventional, and preferably basic lining, made for example of tar-bonded dolomite and can by means of a burner be pre-heated to a temperature of 100°–1400° C. before the melt is poured into it from ladle 5. As the melt is covered with a layer of slag 16, no reactions with the atmospheric air take place during the tapping, the transporting and the deslagging, if necessary in a vacuum and in particular the temperature losses of the melt by radiation from the surface are confined to a minimum. Next to the location for the pouring of the melt into the receiving ladle 6 there is above the rails 17 of the ladle trolley a vacuum lifter 18 (a DH installation). The vacuum lifter 18 can be raised or lowered in a frame 19 and is connected by means of a duct 21 equipped with a throttle valve 20 to the vacuum unit 22. In order that during the vacuum treatment alloying, refining and/or deoxidizing agents may be introduced into the melt, the vacuum lifter 18 is provided with a vacuum chute 23 and a hopper 24.

Likewise near the path travelled by the ladle trolley 7 there is a heating hood 25 which can be raised and lowered and has arc electrodes 26. These electrodes 26 are connected to a transformer, (not shown) with an output of, for example 3–15 MVA, and provided with a control (also not shown).

The hood 25 can be made in the form of a simple arch in the manner of the roof of an arc furnace. Alternatively, it can be made vacuum tight, in which case the current supply leads to the electrodes, are also made vacuum tight. In the further alternative, a hood 25 built for heating at atmospheric pressure can be swung aside, and for carrying out a degasification in the ladle a vacuum hood (not illustrated) can be disposed on ladle 6.

The heating hood 25 or the vacuum hood can be equipped with a lance inlet through which an immersion lance 27 with a fire resistant envelope can be introduced into the ladle or the melt. The immersion lance 27 is fastened to a support 28 which can move vertically, and is connected by a pipe or a flexible tube to a container 29 for the pneumatic conveying of powdered or granular additives. If the immersion depth of the lance 27 into the melt is 1.4–2.7 meters, preferably the initially solid additives discharged into the melt, which on contact with the melt evaporate and rise as gas bubbles. Apart from use of the lance 27, solid alloying substances or additive substances can be introduced into the ladle with the aid of a chute or a vacuum sluice 30. The alloying or additive substances are then preferably brought up with the aid of a conveyor system 31 from hoppers 32. Conveyor system 31 also supplies the hopper 24 or the chute 23 of the vacuum lifter 18 with alloying or additive substances.

Finally the heating hood 25 has a suction nozzle 33 with a throttle valve 34 behind which the nozzle 33 is connected through an auxiliary stage 35 with the vacuum installation 22. To the suction nozzle 33 is fitted an adjustable inlet valve 36.

An example of the course of the process can be seen in detail in FIG. 3 which depicts the temperature loss during the separate treatment stages in the treatment of a 60 ton melt in an apparatus such as that shown in FIGS. 1 and 2. The process consists of the following stages:

(a) tapping;
(b) deslagging;
(c) partial quantity degasification;
(d) heating up;
(e) desulphurizing; and
(f) pouring.

From the following tables 1 through 6 the time required for, and the temperature ranges of, the separate process stages can be seen. In addition, Tables 4 to 6 contain a list of the most important data of separate examples of embodiment.

TABLE 1

|  | Time (Hours) | Final Temperature (°C.) |
|---|---|---|
| Melting down, Arc Furnace | 1.5–3 | 1520–1580 |
| Reduction | 0.25–1 | 1570–1660 |
| Tapping | 0.10–0.30 | 1550–1630 |
| Deslagging, with degasification on running into the receiving Ladle | 0.10–0.25 | 1500–1590 |
| Heating with arc | 0.15–1.5 | 1550–1680 |
| Desulphurization | 0.10–0.30 | 1520–1630 |
| Conveyance to Pouring | 0.05–0.15 | 1510–1620 |
| Total | 2.25–6.5 | |

TABLE 2

|  | Time (Hours) | Final Temperature (°C.) |
|---|---|---|
| Melting down, Arc Furance | 1.5–3 | 1520–1580 |
| Reduction | 0.25–1 | 1610–1750 |
| Tapping | 0.10–0.3 | 1570–1710 |
| Deslagging, Pouring from Transfer Ladle to Receiving Ladle | 0.15–0.25 | 1540–1670 |
| Vacuum Treatment - Alloying | 0.10–0.40 | 1530–1650 |
| Desulphurizing | 0.10–0.30 | 1520–1630 |
| Transporting to Pouring | 0.05–0.15 | 1510–1620 |
| Total | 2.25–5.40 | |

TABLE 3

|  | Time (Hours) | Final Temperature (°C.) |
|---|---|---|
| Melting down Arc Furance | 1.5–3 | 1520–1580 |
| Reducing | 0.25–1 | 1580–1660 |
| Tapping | 0.10–0.3 | 1550–1630 |
| Deslagging by Pouring from Transfer Ladle to Receiving Ladle | 0.15–0.25 | 1520–1560 |
| Heating with arc | 0.15–1.5 | 1550–1700 |
| DH Vacuum Treatment Alloying | 0.10–0.30 | 1530–1640 |
| Desulphurization | 0.10–0.30 | 1515–1620 |
| Transporting to Pouring | 0.05–0.15 | 1500–1610 |
| Total | 2.4–6.9 | |

TABLE 4

|  | Time (Hours) | °C. | C (%) | Si (%) | Mn (%) | S (%) | P (%) | Al (%) | $O_2$ (ppm) | $H_2$ (ppm) | Slag |
|---|---|---|---|---|---|---|---|---|---|---|---|
| Normal Analysis |  |  | 0.44/47 | 0.20/25 | 0.65/–75 | <0.010 | <0.010 | 0.015/25 | <30 | <2 |  |
| Melting Down in Arc Furnace | 1.5 | 1540 | 0.70 | 0.02 | 0.40 | 0.025 | 0.023 |  |  |  |  |
| Reduction | 0.5 | 1620 | 0.40 | 0.01 | 0.30 | 0.020 | 0.008 |  | 180 | 3.5 | Non-Reduced Furnace Slag |
| Pouring Jet Degasification in the Receiving Ladle Desulphurization by Means of CaSi in Carrier Gas | 0.25 | 1590 | 0.39 | 0.01 | 0.30 | 0.021 | 0.008 |  | 120 | 3.7 | 5–30 cm High |

TABLE 4-continued

| | Time (Hours) | °C. | C (%) | Si (%) | Mn (%) | S (%) | P (%) | Al (%) | $O_2$ (ppm) | $H_2$ (ppm) | Slag |
|---|---|---|---|---|---|---|---|---|---|---|---|
| (10 1/t min.) Heating up with Arc Plus Alloying with Stirring Gas | 0.15 | 1540 | 0.38 | 0.02 | 0.28 | 0.020 | 0.008 | | 40 | 1.3 | Slag Free 8 kg/t Mixture $CaO:SiO_2=$ 5:1 |
| (10 1/t min.) | 0.3 | 1530 | 0.38 | 0.15 | 0.28 | 0.007 | 0.008 | 0.030 | 20 | 1.3 | |
| | | 1565 | 0.45 | 0.23 | 0.73 | 0.008 | 0.008 | 0.0023 | 25 | 1.5 | 3 kg/t Mixture $CaO:SiO_2:$ $Al_2O_3=4,5:$ 1:4,5 |
| Transporting to the Pouring | 0.10 | 1560 | 0.45 | 0.23 | 0.73 | 0.008 | 0.008 | 0.020 | 25 | 1.5 | |
| Total | 2.95 | | | | | | | | | | |

TABLE 5

| | Time (Hours) | °C. | C (%) | Si (%) | Mn (%) | S (%) | $O_2$ (ppm) | P (%) | $H_2$ (ppm) | Slag |
|---|---|---|---|---|---|---|---|---|---|---|
| Normal Analysis Rail Steel | | | 0.65/73 | <0.30 | 1.05/1.30 | <0.035 | | <0.035 | | |
| Oxygen Blowing (or Bubbles) in the Rotor | 0.50 | | | | | | | | | Unreduced Convertor Slag, 8cm High |
| | 0.15 | 1610 | 0.08 | 0.01 | 0.15 | 0.025 | 450 | 0.012 | 2.3 | |
| | | 1585 | 0.07 | 0.01 | 0.14 | 0.025 | 420 | 0.011 | 2.5 | |
| Deslagging with Degassing During Passage Through The Ladle in the Receiving Ladle Alloying and Heating with Arc Installation | 0.20 | 1540 | 0.05 | 0.02 | 0.16 | 0.025 | 150 | 0.011 | 1.4 | Slag Free 10 kg/t Mixture $CaO:SiO:Al_2O_3$ =6:1:3 |
| | 0.85 | 1510 | 0.68 | 0.25 | 1.25 | 0.018 | 55 | 0.010 | 1.6 | |
| Transporting to the Pouring | 0.1 | 1505 | 0.68 | 0.25 | 1.25 | 0.018 | 50 | 0.010 | 1.6 | |
| Total | 1.8 | | | | | | | | | |

TABLE 6

| | Time (Hours) | °C. | C (%) | Si (%) | Mn (%) | S (%) | P (%) | Al (%) | $O_2$ (ppm) | $H_2$ (ppm) |
|---|---|---|---|---|---|---|---|---|---|---|
| Normal Analysis | | | 0.15/18 | 0.30/40 | 1.35/1.45 | >0.005 | >0.010 | 0.030 | 30 | 2 |
| Melting Down | 2.00 | 1550 | 0.38 | 0.01 | 0.28 | 0.030 | 0.025 | | 80 | |
| Running Off | 0.10 | 1575 | 0.15 | 0.01 | 0.25 | 0.022 | 0.007 | | 200 | 3.2 |
| Reduction Deslagging, Pouring from Furnace Ladle to Receiving Ladle Heating up with Arc Installation Quantity of Flushing Gas | 0.75 | 1595 | | | | | | | | |
| | 0.20 | 1530 | 0.15 | 0.01 | 0.25 | 0.022 | 0.007 | | 180 | 3.3 |
| (5 1/t min.) DH Vacuum Decarbonization Addition of Mill Scale Alloying | 0.80 | 1670 | 0.14 | 0.02 | 0.25 | 0.019 | 0.008 | | 180 | 3.5 |
| Desulphurization | 0.35 | 1585 | 0.10 0.17 | 0.17 | 1.39 | 0.019 | 0.008 | 0.045 | 25 | 1.7 |
| with CaSi | 0.2 | 1575 | 0.17 | 0.32 | 1.39 | 0.002 | 0.008 | 0.045 | 23 | 1.8 |
| Transporting to Pouring | 0.10 | 1570 | | | | | | | | |
| Total | 4.50 | | | | | | | | | |

Having now in detail described and ascertained our said invention and the manner in which the same is to be performed, we declare that what we claim is:

1. A process for the manufacture of high quality steels with analyses within a very close range of tolerances from solid raw materials including the smelting, refining and alloying of steel melts comprising:

melting down each of the solid raw materials utilized in the process in a first vessel;

at least partially refining the resulting melt while it is in said first vessel and under a slag;

tapping said melt and slag into a second vessel;

deslagging said melt by discharging said melt from said second vessel into a third vessel without said slag; and thereafter alloying and desulfurizing said melt to produce the desired high quality steel.

2. A process according to claim 1 including in addition stirring the melt while heating the melt.

3. A process according to claim 1 wherein said melting down is effected substantially without metallurgical reactions other than decarbonization and dephosphorization.

4. A process according to claim 1 wherein deslagging is accomplished by flowing the melt through the bottom outlet of a transfer ladle into a receiving ladle, the slag being retained in the transfer ladle.

5. A process according to claim 4 wherein the receiving ladle is maintained under a vacuum during the deslagging.

6. A process according to claim 4 wherein during the deslagging a flushing gas is introduced into the deslagged melt.

7. A process according to claim 4 including in addition subjecting the slag free melt to a partial quantity degasification.

8. A process according to claim 1 including in addition heating up of the melt which is treated at atmospheric pressure or in a vacuum.

9. A process according to claim 8 wherein during the heating up the melt is flushed with nitrogen and/or an inert gas.

10. A process according to claim 1 including the introduction of treating media into the melt.

11. A process according to claim 10 wherein the treating media is introduced with the aid of a carrier gas.

12. A process according to claim 1 including the step of heating the melt and the melt is desulphurized before, during or after the heating step.

13. A process according to claim 1 including in addition desulphurizing the melt by blowing into the melt calcium, magnesium or compounds or alloys of those elements which evaporate at the temperature of the steel melt.

14. A process according to claim 1 including bringing the melt up to pouring temperature before the pouring operation takes place.

15. A process according to claim 4 wherein the melt remains in the receiving ladle from the deslagging until the pouring.

16. A process according to claim 8 wherein dust and gases are prevented from escaping from the units which are operating at normal pressure by maintaining a low degree of partial vacuum with the aid of an auxiliary stage attached to the vacuum unit and of a control device, and the gases so drawn off are cleaned in the condensors of a steam jet suction unit.

* * * * *